United States Patent
Huang

(10) Patent No.: US 9,954,481 B2
(45) Date of Patent: Apr. 24, 2018

(54) LINEAR DRIVE APPARATUS AND METHOD OF CONTROLLING AND USING SAME FOR SOLAR ENERGY TRACKING

(71) Applicant: SICHUAN ZHONG SHUN SOLAR ENERGY DEVELOPMENT CO., LTD., Chengdu, Sichuan (CN)

(72) Inventor: Zhong Huang, Chengdu (CN)

(73) Assignee: SICHUAN ZHONG SHUN SOLAR ENERGY DEVELOPMENT CO., LTD. (CN)

( * ) Notice: Subject to any disclaimer, the term of this patent is extended or adjusted under 35 U.S.C. 154(b) by 280 days.

(21) Appl. No.: 14/406,716

(22) PCT Filed: Sep. 27, 2013

(86) PCT No.: PCT/CN2013/084392
§ 371 (c)(1),
(2) Date: Dec. 9, 2014

(87) PCT Pub. No.: WO2014/075518
PCT Pub. Date: May 22, 2014

(65) Prior Publication Data
US 2015/0188484 A1    Jul. 2, 2015

(30) Foreign Application Priority Data
Nov. 13, 2012 (CN) .......................... 2012 1 0452724

(51) Int. Cl.
*F16H 1/26* (2006.01)
*F16H 3/06* (2006.01)
(Continued)

(52) U.S. Cl.
CPC ............ *H02S 20/32* (2014.12); *F16H 25/20* (2013.01); *F16H 25/2418* (2013.01); *F24J 2/38* (2013.01);
(Continued)

(58) Field of Classification Search
CPC ................ F16H 25/2418; F16H 25/20; F16H 2025/2075; F16H 2025/2087;
(Continued)

(56) References Cited

U.S. PATENT DOCUMENTS 3,884,040 A * 5/1975 Green ...................... F15B 7/08
188/353
4,000,664 A * 1/1977 Christensen ........ F16H 25/2204
74/467
(Continued)

FOREIGN PATENT DOCUMENTS

CN    200997545 Y    12/2006
CN    102152318 A    5/2011
(Continued)

OTHER PUBLICATIONS

Jan. 2, 2014, International Search Report in PCT/CN2013/084392.
(Continued)

*Primary Examiner* — Jake Cook
(74) *Attorney, Agent, or Firm* — Mei & Mark LLP

(57) ABSTRACT

A linear drive apparatus is provided. The linear drive apparatus may include an outer tube, a sealing end cap provided at the end of the outer tube, a screw provided in the outer tube, a drive nut provided on the screw in a threaded fit, an extension rod provided between the outer tube and the screw, a sealing assembly provided between the extension rod and the sealing end cap, and a waterproof and oil-proof ventilation stopper provided on the outer tube. One end of the screw may be connected to a drive mechanism. One end of the extension rod may be connected to the drive nut. The other end of the extension rod may pass through the sealing end cap.

16 Claims, 6 Drawing Sheets

(51) Int. Cl.
*F16H 27/02* (2006.01)
*F16H 29/08* (2006.01)
*F16H 29/20* (2006.01)
*H02S 20/32* (2014.01)
*F16H 25/20* (2006.01)
*F24J 2/38* (2014.01)
*H02S 40/30* (2014.01)
*F16H 25/24* (2006.01)
*F24J 2/54* (2006.01)

(52) U.S. Cl.
CPC ........ *H02S 40/30* (2014.12); *F16H 2025/204* (2013.01); *F16H 2025/2087* (2013.01); *F24J 2002/5437* (2013.01); *Y02E 10/47* (2013.01); *Y10T 74/1868* (2015.01); *Y10T 74/18712* (2015.01)

(58) Field of Classification Search
CPC ......... F16H 57/0497; F16H 2025/2481; F16H 2025/2031; F16H 2025/2037; F16H 57/027; H02S 20/32
USPC .......................................................... 277/928
See application file for complete search history.

(56) References Cited

U.S. PATENT DOCUMENTS

| | | | | |
|---|---|---|---|---|
| 4,137,784 A * | 2/1979 | Griffin | ...................... | B66F 3/08 254/103 |
| 4,392,390 A * | 7/1983 | Johnson | .............. | F16H 25/2204 464/173 |
| 4,593,572 A * | 6/1986 | Linley, Jr. | ................ | B23Q 5/40 74/424.96 |
| 4,802,558 A * | 2/1989 | Garnett | .................. | B23Q 5/408 188/134 |
| 5,125,428 A * | 6/1992 | Rauter | ............... | B01D 19/0031 137/199 |
| 5,622,078 A | 4/1997 | Mattson | | |
| 6,158,295 A * | 12/2000 | Nielsen | ................... | F16H 25/20 192/223.4 |
| 2008/0295624 A1* | 12/2008 | Oberle | ................... | B60N 2/067 74/89.34 |
| 2009/0193917 A1* | 8/2009 | Jensen | ................... | H02K 7/102 74/22 R |
| 2009/0260463 A1* | 10/2009 | Fukano | ............... | F16H 25/2454 74/89.33 |
| 2009/0260464 A1* | 10/2009 | Holker | ................ | F16H 57/0497 74/89.33 |
| 2009/0270220 A1* | 10/2009 | Fukano | ..................... | F16H 3/54 475/300 |
| 2010/0282008 A1* | 11/2010 | Knudsen | ............. | F16H 25/2015 74/89.23 |
| 2010/0315031 A1 | 12/2010 | Knudsen | | |

FOREIGN PATENT DOCUMENTS

| | | |
|---|---|---|
| CN | 102142795 A | 8/2011 |
| CN | 102968127 A | 3/2013 |
| CN | 203176284 U | 9/2013 |
| DE | 102008062400 A1 | 6/2010 |
| DE | 102009007958 A1 | 10/2010 |
| EP | 1231412 B1 | 8/2002 |
| EP | 1595681 A1 | 11/2005 |
| KR | 20090028109 A | 3/2009 |

OTHER PUBLICATIONS

Jan. 2, 2014, Written Opinion of the ISA in PCT/CN2013/084392.
Jul. 3, 2014, First Office Action for Corresponding Chinese Application 201210452724.
Dec. 4, 2014, Second Office Action for Corresponding Chinese Application 201210452724.
Jun. 1, 2015, Third Office Action for Corresponding Chinese Application 201210452724.
Oct. 16, 2015, Fourth Office Action for Corresponding Chinese Application 201210452724.
May 23, 2016, Supplementary European search report for Corresponding EP 13 85 5234.

* cited by examiner

LINEAR DRIVE APPARATUS AND METHOD OF CONTROLLING AND USING SAME FOR SOLAR ENERGY TRACKING

TECHNICAL FIELD OF THE INVENTION

The invention relates to the field of solar-energy tracking technique, particularly to a linear drive apparatus and a method of controlling and using the same for solar-energy tracker.

TECHNICAL BACKGROUND OF THE INVENTION

Figure 1:
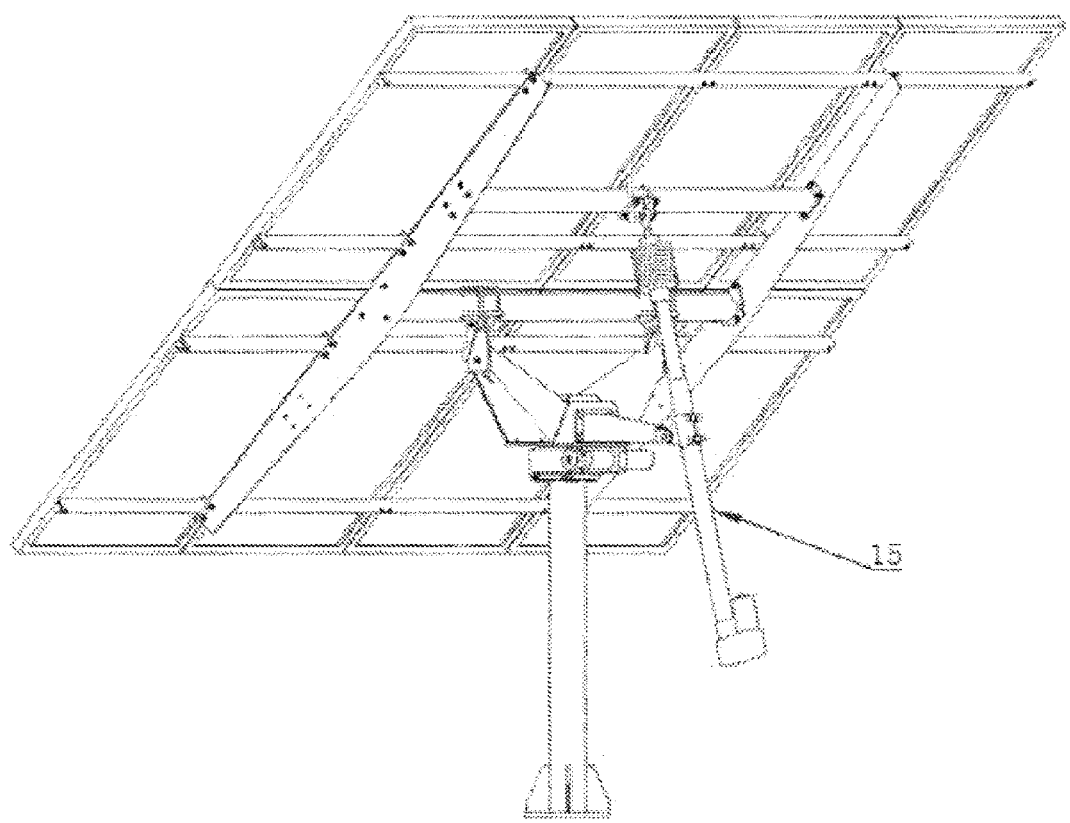

As shown in FIG. 1, a linear drive apparatus 15 in the prior art is concretely applied in a solar-energy tracker, and mainly used for tracking and driving an elevation angle (also an azimuthal angle) of a solar-energy biaxial tracker and for driving a uniaxial tracker. The linear drive apparatus in the prior art mainly has the following problems:

1. When the solar tracker (biaxial and uniaxial) is designed, the center of gravity of a moving part shall coincide with (closely) a rotation axis, thereby decreasing the drive torque needed during tracking to further meet the requirement of low energy consumption of the tracker itself. In practical engineering applications, due to the special structural constraints of the tracker, such a driver, in addition to providing driving force, also provides the support and the stabilizing effects for the moving part. Under the influence of big wind and heavy snow, the requirement for the stiffness (resistance to deflection) of the driver is very high, that is to say, such a driver shall provide sufficient driving force while having high anti-load capacity and adequate stiffness (resistance to deflection), thus guaranteeing that the tracker can accurately track and stably operate.

Such a driver in the prior art for the solar tracker and the desired driving force are taken as design basis. The length-diameter ratio of such a drive screw is designed to be 30-40, and the length-diameter ratio of a drive nut is designed to be 1.5-2. A deep groove ball bearing is used for the rotation part of the screw, which can meet the requirement of the driving force but in which the rigidity and anti-load capacity of the driver are limited. Furthermore, an extension rod of the driver in the prior art is in a big-gap fit with an outer tube. In engineering applications, when the driver is pulled and pressed by the rotation part of the tracker, the gap increases the deflection of the screw and facilitates the tracker shake not to track precisely.

2. In practical applications of the solar tracker, the tracker is operated under a variety of extreme conditions outdoors all the year round. As a key component of the tracker, such a driver must have very high degree of protection, and must ensure that a lubrication system runs well all lifetime.

The extension rod of the driver in the prior art is in the big-gap fit with the outer tube. In practical application, water, dust and debris are easily entered into the inner part of the driver, thus influencing a drive system (a gear and a screw drive nut) of the driver (even electrical systems), and seriously affecting the normal operation of the tracker. Even if some apparatuses are provided with a dustproof cover, due to the working environment of the apparatus itself, the dustproof cover is very easily aged and damaged. Once damaged, it will also face these problems.

3. In the practical applications of the solar tracker, the signal feedback of the driver is a key for the tracker to accurately track. An accurate and reliable signal feedback system is a necessary condition for the normal operation of the tracker.

A common gear transmission is adopted to drive such a driver motor and the screw. The integral signal feedback system of the gear transmission is in non-sealing process with an interface of the screw. In practical applications, the rainwater infiltrated through the extension rod can directly reach the inner part of the transmission, causing the gear to be rusted, and the signal feedback system to have short-circuit. It produces ice under a low temperature environment, thus causing the driver not to work. Furthermore, the signal feedback system of the driver is designed to be integrated with the transmission, thus increasing the difficulty of maintenance and replacement.

4. Such a driver in the prior art adopts the current monitoring of the motor to achieve protection. A complicate external circuitry is needed to be provided and a system hardware is needed to comprise an A/D conversion module, taking up a lot of system resources. As to the current monitoring of the motor in the prior art, the voltage change on resistance is sampled through the influence caused after the current change of the resistance is sampled externally. A control system, through judging the voltage of sampling resistance, monitors the current of the motor. The method also has the disadvantages of larger errors and no timely reaction.

SUMMARY OF THE INVENTION

As to the above problems, the object of the invention is to provide a linear drive apparatus for improving tracking accuracy of a solar-energy tracker with reliable stable operation, strong deflection resistance and high anti-load capacity, and a method for controlling and using the same.

The technical solution of the invention is as follows: a linear drive apparatus comprises an outer tube and a sealing end cap provided at the end of the outer tube, a screw is provided in the outer tube, one end of the screw is connected to a drive mechanism, a drive nut is provided on the screw in a threaded fit therewith, an extension rod is provided between the outer tube and the screw, one end of the extension rod is connected to the drive nut, and the other end thereof passes through the sealing end cap, a sealing assembly is provided between the extension rod and the sealing end cap, and a waterproof and oil-proof ventilation stopper is provided on the outer tube.

As to the linear drive apparatus of the invention, a single-row tapered roller bearing is provided correspondingly in the outer tube and at connection ends between the screw and the drive mechanism, an outer ring of the single-row tapered roller bearing is connected to an inner wall of the outer tube, and an inner ring thereof is closely fitted with the screw, and a sliding bearing is provided between the extension rod and the sealing end cap.

As to the linear drive apparatus of the invention, a dustproof ring is provided at the end of the sealing end cap and between the extension rod and the sealing end cap, the sealing assembly is provided between the dustproof ring and the sliding bearing, and the sealing assembly consists of at least one group of O-shape sealing rings.

As to the linear drive apparatus of the invention, the length-diameter ratio of the screw is 20-25, the length-diameter ratio of the drive nut (4) is 3-5, and a wear-resistant rust-proof layer is provided on a surface of the extension rod.

As to the linear drive apparatus of the invention, its drive mechanism is a DC motor with a planet reduction gear and Hall signal feedback, and a power output terminal of the DC motor is connected to one end of the screw through a coupling.

As to the linear drive apparatus of the invention, the outer tube is in a threaded connection with the front and the back sections thereof and welded into one integral structure, the front end of the screw is positioned at the front section of the outer tube and is in a drive connection with the DC motor through the coupling, the sealing end cap is provided at the end of the back section of the outer tube, the extension rod is positioned in the back section of the outer tube, the O-shaped sealing ring is provided between the sealing end cap and the end of the back section of the outer tube, and the sealing ring is provided between the screw and an interface of the coupling.

A method for controlling solar tracking with a linear drive apparatus according to preceding claims comprises the following steps:

a) determining solar tracking orientation through a controller of a solar tracker firstly, and then determining the current solar angles P1 in different periods through the solar tracking orientation;

b) comparing the current solar angle PI with the initial angle P0 of the solar tracker to judge whether the current linear drive apparatus is needed to act, wherein the initial angle of the solar tracker is determined by structure design;

c) calculating the number M of pulses tracked this time by a processor according to the current solar angle P1 and the initial angle P0 of the solar tracker, and controlling a motor in the linear drive apparatus to rotate according to the number M of the pulses, if the linear drive apparatus is needed to act;

d) sending to a driver a signal tracked and rotated this time by the processor, driving the motor in the linear drive apparatus to act by the driver after the driver receives a control signal, and determining whether the linear drive apparatus extends or shortens based on the positive-negative voltage of the motor input by the driver;

the Step c) has a following concrete calculation method:

the reduction speed ratio of a planet reduction gear in the linear drive apparatus is firstly determined to be 1:T, an encoder produces N orthogonal coded signals if the motor rotates one circle, the extension rod extends by S after the screw rotates one circle, wherein T is determined based on the adopted planet reduction gear, the number of N of the orthogonal coded signals is determined by the encoder, the extension amount of S of the extension rod obtained through one circle of rotation of the screw is the thread pitch value of the screw, that is to say, when the motor outputs T*N signals, the extension rod extends S mm, each millimeter corresponds to T*N/S pulses;

secondly, the linear drive apparatus, when being in the initial place, has the length of H, the length of the connection between the end of the extension rod and a rotation point of a solar-energy panel through a connection rod is B, the distance between the lower part of the linear drive apparatus and a connection point of a mounting base is Z, the length from the lower part of the linear drive apparatus and the mounting point of the mounting base to the rotation point of the solar-energy panel is A, the length from the lower part of the linear drive apparatus and the connection point of the mounting base to the connection points of the extension rod and the connection rod is C. In an HZC triangle, the change of H directly influences the change of C, in an ABC triangle, A and B are fixed, and the change of C directly influences the angle between A and B, according to the above-mentioned triangle relations, the following relations can be obtained:

in the ABC triangle, Formula 1: $C^2 = A^2 + B^2 - 2ABC0S(P)$, wherein P is the angle of AB, in the HCZ triangle, $$C^2 = H^2 + Z^2, \qquad \text{Formula 2}$$

in $$H^2 = A^2 + B^2 - Z^2 - 2ABC0S(P), \qquad \text{Formula 3}$$

the structure design determines to track the initial angle, according to the initial angle P0, the initial H0 can be obtained;

if the extension amount is assumed to be y, and the rotating angle of the solar-energy panel is X, the following relation can be obtained:

$$y = H - H0 = A^2 + B^2 - Z^2 - 2AB \cos(X) - H0, \qquad \text{Formula 4}$$

in Formula 4, A, B, Z and HO are all determined, the arbitrarily given X directly determines the value of y, the positive-negative y determines the tracking direction;

if the current solar angle obtained by a controller is P1, and the current angle of the tracker is P0, according to Formula 4: $y(p1) - y(p\theta) = d$, d is the drive amount of the linear drive apparatus this time;

finally, M=d*T*N/S is the pulse number of the drive this time, the number of the rotation circles of the motor is obtained according to the pulse number of the drive this time, so that the motor is controlled to be rotated by the driver, so as to obtain the needed amount of the extension or shortening of the extension rod of the linear drive apparatus.

As to the method for controlling the solar tracking with the linear drive apparatus of the invention, a drive control system is provided in the linear drive apparatus. During the operation of the linear drive apparatus, according to its property that its rotation speed is also changed with the change of the load of a DC motor, the drive control system carries out real-time monitoring for the frequency of a feedback pulse signal, and controls the linear stroke of the extension rod according to the number of the feedback pulse signals.

As to the method for controlling the solar tracking with the linear drive apparatus of the invention, in Step d), the controller starts a monitoring module while driving the driver, when the controller detects that the frequency of the pulse signal generated by Hall element during the rotation of the motor is decreased, the rotation speed of the motor is indicated to be decreased, when the rotation speed of the motor is lower than rated value, the controller starts a protection module to prevent the driver from overload operation and damage and realize the timely effective protection for the driver.

A method for using solar tracking with a linear drive apparatus according to preceding claims is characterized in that: when the linear drive apparatus is used, the linear drive apparatus, corresponding to a rotation part of a solar tracker, is at a rotation axis with center-of-gravity shift, with the action of the gravity, the rotation part of the solar tracker, during its whole tracking process, always maintains a pulling or pressing force on the linear drive apparatus.

According to use environment of a solar tracker, as to deflection resistance, high anti-load capacity and protection aspects of the apparatus itself, the invention designs correspondingly a structure, so that during the application of the solar tracker, the apparatus operates reliably and stably as well as has strong deflection resistance and high anti-load capacity, thus effectively increasing the tracking accuracy of the solar-energy tracker.

As the above technical solution is adopted, the invention has the following effects:

1. The invention, when being designed, fully considers the load which the driver can bear under big wind, heavy snow and other extreme weathers. After calculation, the length-diameter ratio of the screw is determined to be 20~25, the length-diameter ratio of the drive nut (4) is determined to be 3~5. The texture adopts QT500. The rotation part of the screw adopts one group of single-row tapered roller bearings. Compared with a deep groove ball bearing in the structure in the prior art, the single-row tapered roller bearing can provide larger axial load to improve the anti-load capacity of the driver. Furthermore, with the increase in the processing accuracy of an outer diameter of an extension rod and in the abrasion resistance of a cladding layer of the extension rod, a sliding bearing is added between the outer pipe and the extension rod, thus eliminating a gap and the shaking caused by the gap, greatly improving the deflection resistance and the anti-load capacity, making pulling force-load ratio of the driver reach 1:6, improving the tracking accuracy, and making the driver operate more stably.

2. The invention mainly considers leak tightness, and totally seals the screw, a transmission of a drive nut and the outer tube integrally. Meanwhile, in order to eliminate the impact of the difference between internal air pressure and external air pressure in the outer tube on a sealing ring and sealing effect caused by completely sealing when the extension rod moves, the outer tube of the invention is provided with a waterproof and oil-proof ventilation stopper, so that the difference between the internal air pressure and the external air pressure remains fully balanced at any time. As the complete sealing is realized, based on this driver in the prior art which only can adopt lubrication grease to carry out the lubrication, the invention also can use lubrication oil to carry out the lubrication, thus greatly improving the lubrication effect of the driver and the reliability of a lubrication system. Moreover, this driver integrates a dustproof ring and a sealing ring into assemblies, so that they can be easily replaced after they are aged.

3. The drive mechanism of the invention adopts the motor with the planet reduction gear and Hall signal feedback. The motor, the planet reduction gear and a signal feedback system are independent with each other and integrated into a drive module and a signal feedback module after assembly, with their protection levels of IP65. They completely can be reliably and stably operated under various environments. They can be quickly replaced in case of failure, thus reducing the loss of the electricity generation of a small power plant due to the failure of the tracker.

DRAWINGS OF THE INVENTION

Figure 2:
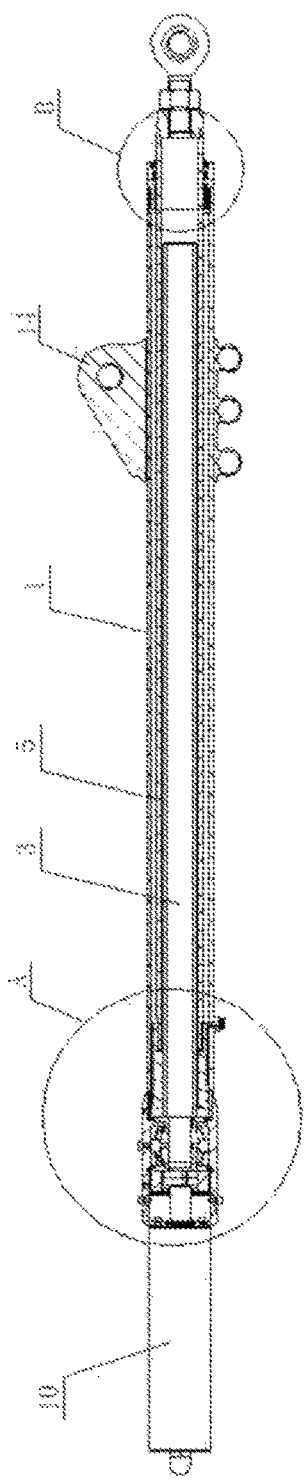
Figure 3:
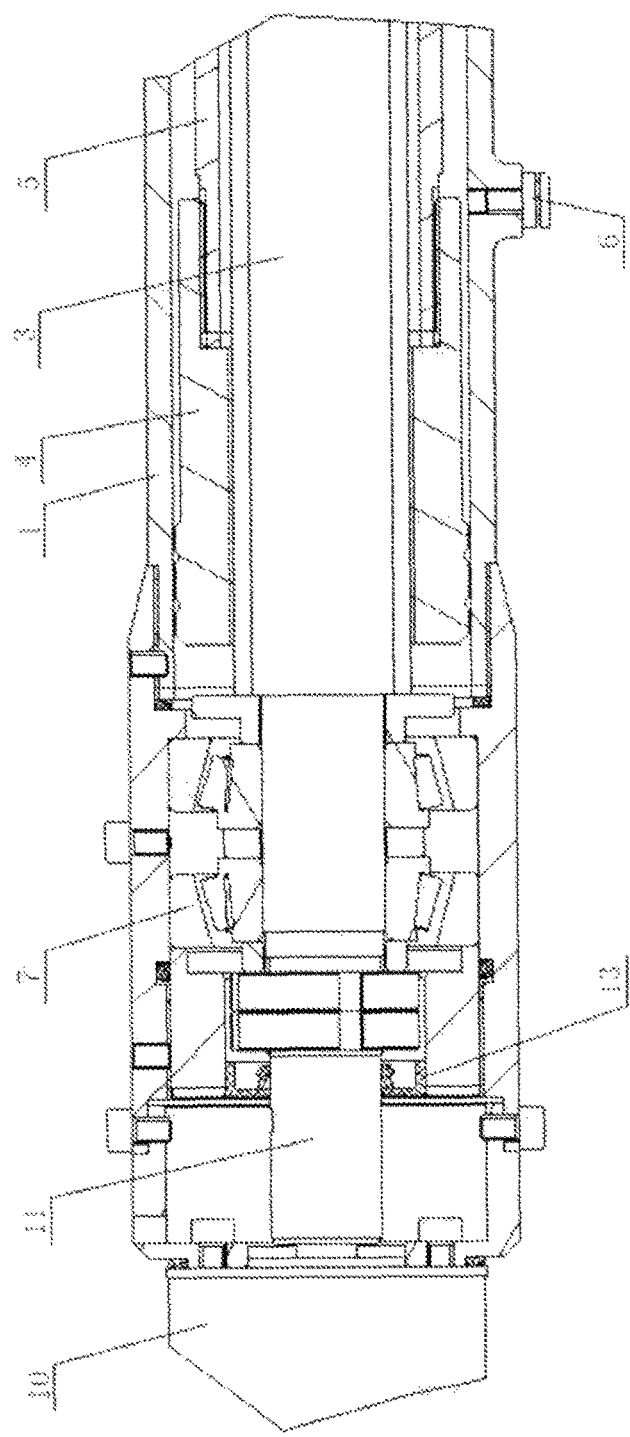
Figure 4:
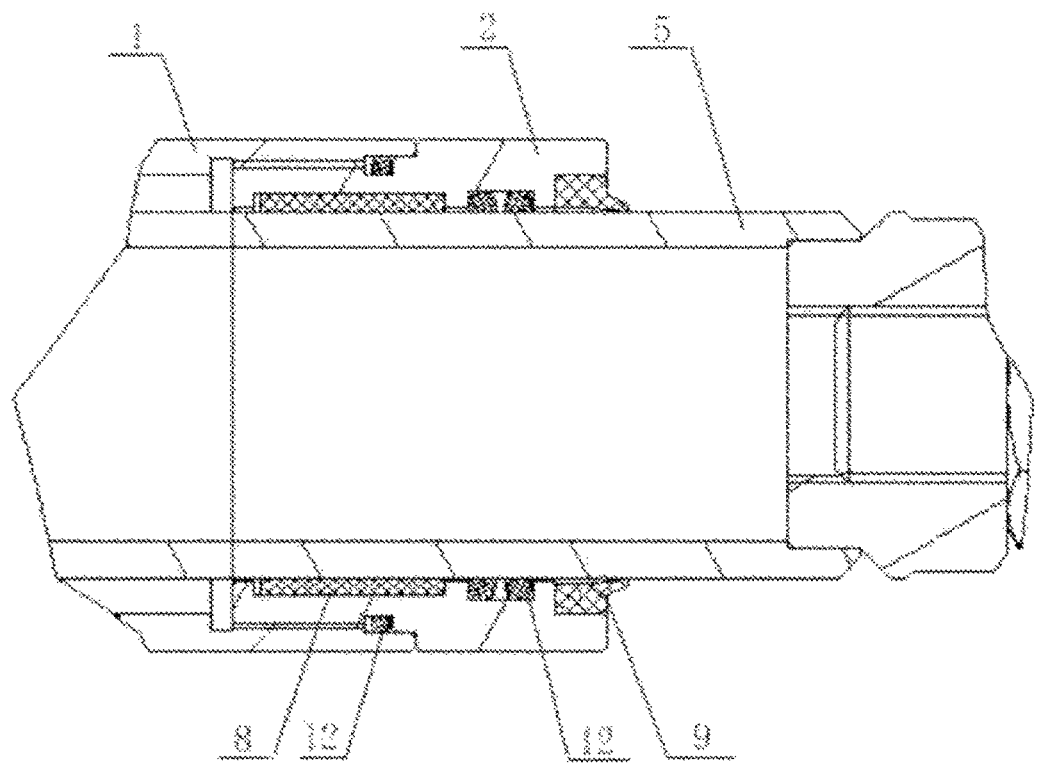
Figure 5:
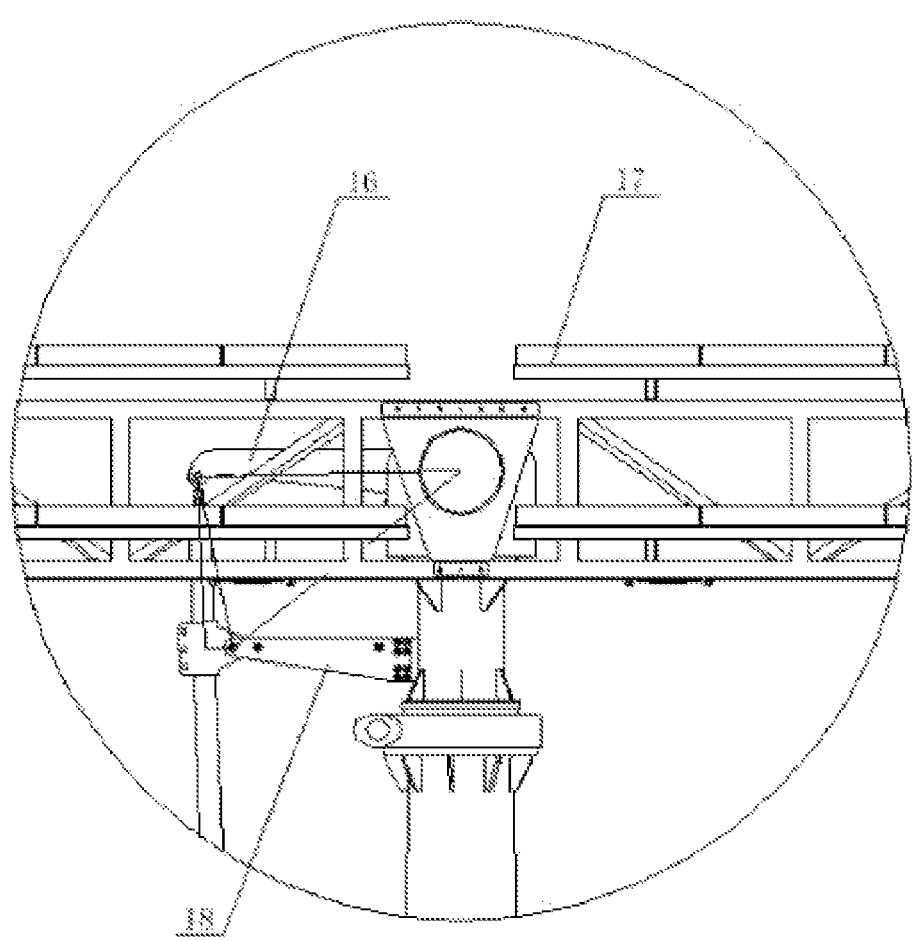
Figure 6:
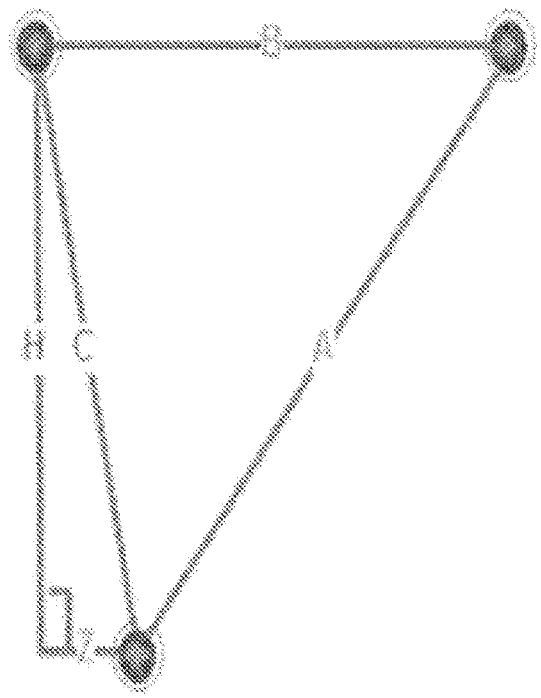

FIG. 1 is a diagram of a linear drive apparatus in the prior art applied on a solar tracker.
FIG. 2 is a structure diagram of the invention.
FIG. 3 is an enlarged drawing of part A in FIG. 2.
FIG. 4 is an enlarged drawing of part B in FIG. 2.
FIG. 5 is a diagram of a linear drive apparatus of the invention applied on a solar tracker.
FIG. 6 is a connection relation drawing of a linear drive apparatus of the invention.

Reference Signs: 1: Outer Tube, 2: Sealing End Cap, 3: Screw, 4: Drive Nut, 5: Extension Rod, 6: Waterproof And Oil-Proof Ventilation Stopper, 7: Tapered Roller Bearing, 8: Sliding Bearing, 9: Dustproof Ring, 10: DC Motor, 11: Coupling, 12: O-Shaped Sealing Ring, 13: Sealing Ring, 14: Mounting Supporting Lug, 15: Linear Drive Apparatus In Prior Art, 16: Connection Rod, 17 Solar-Energy Panel, 18: Mounting Base:

EMBODIMENTS OF THE INVENTION

With the combination of the following drawings, the invention is described in details.

The invention will be further described in more details and the purposes, the technical solution and the advantages of the invention will be more apparent with the combination of the following drawings and embodiments. It shall be understood that the embodiments described herein are only used for explaining the invention but do not limit the invention.

As shown I FIGS. 1, 2, a linear drive apparatus comprises an outer tube 1 and a sealing end cap 2 provided at the end of the outer tube 1, a mounting support lug 14 is provided on the outer tube, a screw 3 is provided in the outer tube 1, the length-diameter ratio of the screw 3 is 20~25, one end of the screw 3 is connected to a drive mechanism, a single-row tapered roller bearing 7 is provided correspondingly in the outer tube 1 and at connection ends between the screw 3 and the drive mechanism, an outer ring of the single-row tapered roller bearing 7 is connected to an inner wall of the outer pipe 1, an inner ring thereof is closely fitted with the screw 3, the drive mechanism is a DC motor 10 with a planet reduction gear and Hall signal feedback, a power output terminal of the DC motor 10 is connected to one end of the screw 3 through a coupling 11, and the sealing ring 13 is provided between the screw 3 and an interface of the coupling 11, a drive nut 4 is provided on the screw 3 in a threaded fit therewith, an extension rod 5 is provided between the outer tube 1 and the screw 3, a wear-resistant rust-proof layer is provided on a surface of the extension rod 5, one end of the extension rod 5 is connected to the drive nut 4 and the other end thereof passes through the sealing end cap 2, a sealing assembly and a sliding bearing 8 are provided between the extension rod 5 and the sealing end cap 2, a dustproof ring 9 is provided at the end of the sealing end cap 2 and between the extension rod 5 and the sealing end cap 2, the sealing assembly is provided between the dustproof ring 9 and the sliding bearing 8, and the sealing assembly consists of two groups of O-shape sealing rings 12, wherein the outer tube 1 is in a threaded connection with the front and the back sections thereof and welded into one integral structure, a waterproof and oil-proof ventilation stopper 6 is provided on the back section of the outer tube 1, the front end of the screw 3 is positioned at the front section of the outer tube 1 and is in a drive connection with the DC motor 10 through the coupling 11, the sealing end cap 2 is provided at the end of the back section of the outer tube 1, the extension rod 5 is positioned in the back section of the outer tube 1, and the O-shaped sealing ring 12 is provided between the sealing end cap 2 and the end of the back section of the outer tube 1.

A method for controlling solar tracking with the above linear drive apparatus comprises the following steps:

a) determining solar tracking orientation through a controller of a solar tracker firstly, and then determining the current solar angles P1 in different periods through the solar tracking orientation;

b) comparing the current solar angle PI with the initial angle P0 of the solar tracker to judge whether the current linear drive apparatus is needed to act, wherein the initial angle of the solar tracker is determined by structure design;

c) calculating the number M of pulses tracked this time with a processor according to the current solar angle P1 and the initial angle P0 of the solar tracker, and controlling a motor in the linear drive apparatus to rotate according to the number M of the pulses, if the linear drive apparatus is needed to act; and d) sending to a driver a signal tracked and rotated this time with the processor, driving the motor in the linear drive apparatus to act with the driver after the driver receives a control signal, and determining whether the linear drive apparatus extends or shortens based on the positive-negative voltage of the motor input by the driver.

the step c) has a following concrete calculation method:

the reduction speed ratio of a planet reduction gear in the linear drive apparatus is firstly determined to be 1:T, an encoder produces N orthogonal coded signals if the motor rotates one circle, the extension rod extends by S after the screw rotates one circle, wherein T is determined based on the adopted planet reduction gear, the number of N of the orthogonal coded signals is determined by the encoder, the extension amount of S of the extension rod obtained through one circle of rotation of the screw is the thread pitch value of the screw, that is to say, when the motor outputs T*N signals, the extension rod extends S mm, each millimeter corresponds to T*N/S pulses. If the reduction speed ratio of the planet reduction gear of the linear drive apparatus is 1:135; two orthogonal coded signals is produced if the motor rotates one circle, and the extension rod extends by 5 mm for each circle, when the DC motor outputs 135*2 signals, the extension tube extends 5 mm, each millimeter corresponds to 54 pulses.

Secondly, as shown in FIGS. 5, 6, the linear drive apparatus, when being in the initial place, has the length of H, the length of the connection between the end of the extension rod and a rotation point of a solar-energy panel through a connection rod is B, the distance between the lower part of the linear drive apparatus and a connection point of a mounting base is Z, the length from the lower part of the linear drive apparatus and the mounting base to the rotation point of the solar-energy panel is A, the length from the lower part of the linear drive apparatus and the connection point of the mounting base 18 to the connection points of the connection rod and the connection rod 16 is C, In an HZC triangle, the change of H directly influences the change of C, in an ABC triangle, A and B are fixed, and the change of C directly influences the angle between A and B, according to the above-mentioned triangle relation, the following relations can be obtained:

in the ABC triangle, $$C^2=A^2+B^2-2AB\cos(P), \text{ wherein } P \text{ is the angle of } AB, \quad \text{Formula 1}$$

in the HCZ triangle, $$C^2=H^2+Z^2, \quad \text{Formula 2}$$

in $$H^2=A^2+B^2-Z^2-2AB\cos(P), \quad \text{Formula 3}$$

the structure design determines to track the initial angle, according to the initial angle P0, the initial H0 can be obtained.

If the extension amount is assumed to be y, and the rotating angle of the solar-energy panel is X, the following relation can be obtained:

$$y=H-H0=A^2+B^2-Z^2-2AB\cos(X)-H0, \quad \text{Formula 4}$$

in Formula 4, A, B, Z and H0 are all determined, the arbitrarily given X directly determines the value of y, the positive-negative y determines the tracking direction;

if the current solar angle obtained by a controller is P1, and the current angle of the tracker is P0, according to Formula 4: y(p1)−y(p0)=d, d is the drive amount of the linear drive apparatus this time;

finally, M=d*T*N/S is the pulse number of the drive this time, the number of the rotation circles of the motor is obtained according to the pulse number of the drive this time, so that the motor is controlled to be rotated by the driver, so as to obtain the needed amount of the extension or shortening of the extension rod of the linear drive apparatus.

After the controller informs the driver to output drive voltage, it starts to calculate feedback signals of the motor of the linear drive apparatus. When the counting number reaches the number of the pulses driven this time, the controller stops the driver to output the drive voltage, thus completing the tracking task of this time. After the driver receives a stopping signal, the driver stops supplying electricity for the DC motor of the linear drive apparatus. Meanwhile, the driver also starts a brake apparatus in the inner part thereof to rapidly stop the rotation of the DC motor of the linear drive apparatus, so as to avoid the influence on tracking accuracy due to overthrow produced by inertia of the motor.

In the practical application of the solar tracker, as it is operated outdoors for a long time, beside the linear drive apparatus needs higher reliability itself, its control system shall have necessary protection function when the linear drive apparatus is used. A drive control system is provided in the linear drive apparatus. During the operation of the linear drive apparatus, according to its property that its rotation speed (the frequency of a feedback pulse signal) is also changed with the change of the load of the DC motor, the drive control system carries out real-time monitoring for the frequency of the feedback pulse signal, and controls the linear stroke of the extension rod according to the number of the feedback pulse signals. In the practical engineering application, the controller starts a monitoring module while driving the driver. When the controller detects that the frequency of the pulse signal generated by Hall element during the rotation of the motor is decreased, the rotation speed of the motor is indicated to be decreased. When the rotation speed (embodied by pulse frequency) of the motor is lower than the rated value (the rated value can be determined by the frequency of the corresponding feedback signal under the different loads of the driver according to the parameters of the motor), the controller starts the protection module to prevent the driver from overload operation and damage, to realize the timely effective protection for the driver. This function is completed totally by a control program, which neither needs any outer monitoring circuitry nor occupies resources of system hardware.

Moreover, the control system is provided with remote monitoring and controlling functions. The technical and maintenance personnel can monitor the operation state of the linear drive apparatus remotely or on site at any time, and predict and dispose its potential fault, thus greatly reducing the failure rate of the solar tracker.

As to a method for solar tracking with the above linear drive apparatus, when the linear drive apparatus is used, the linear drive apparatus, corresponding to a rotation part of a solar tracker, is mounted at a rotation axis with center-of-gravity shift. With the action of the gravity, the rotation part of the solar tracker, during its whole tracking process, always maintains a pulling or pressing force on the linear drive apparatus. During the tracking, when the linear drive apparatus carries out reversal drive, the method totally eliminates the fabrication tolerance of a transmission of a drive nut of a screw and the impact on tracking precision due to abrasion produced by long-term operation, and decreases the accuracy requirements for processing the drive nut of the screw, so that the linear drive apparatus can keep stabler tracking accuracy for long term.

The above-mentioned are only preferred embodiments of the invention and do not limit the invention. Any modification, equal replacement and improvement made within the spirit and the principle of the invention shall be comprised in the protection scope of the invention.

The invention claimed is:

1. A linear drive apparatus, comprising:
   an outer tube with a first tube end and a second tube end, the outer tube including a front section extending from the second tube end and a back section extending from the first tube end;
   a sealing end cap provided at the first tube end;
   a screw provided in the outer tube, a first end of the screw connected to a drive mechanism;
   a drive nut provided on the screw in a threaded fit therewith;
   an extension rod provided between the outer tube and the screw, one end of the extension rod connected to the drive nut and the other end thereof passing through the sealing end cap;
   a sealing assembly provided between the extension rod and the sealing end cap; and
   a waterproof and oil-proof ventilation stopper provided on the outer tube,
   wherein:
   the length-diameter ratio of the screw is 20-25;
   the length-diameter ratio of the drive nut is 3-5; and
   a wear resistant rust-proof layer is provided on a surface of the extension rod.

2. A linear drive apparatus, comprising:
   an outer tube with a first tube end and a second tube end, the outer tube including a front section extending from the second tube end and a back section extending from the first tube end;
   a sealing end cap provided at the first tube end;
   a screw provided in the outer tube, a first end of the screw connected to a drive mechanism;
   a drive nut provided on the screw in a threaded fit therewith;
   an extension rod provided between the outer tube and the screw, one end of the extension rod connected to the drive nut and the other end thereof passing through the sealing end cap;
   a sealing assembly provided between the extension rod and the sealing end cap;
   a waterproof and oil-proof ventilation stopper provided on the outer tube;
   a single-row tapered roller bearing provided in the outer tube;
   an outer ring of the single-row tapered roller bearing connected to an inner wall of the outer tube;
   an inner ring of the single-row tapered roller bearing fitted with the screw;
   a sliding bearing provided between the extension rod and the sealing end cap; and
   a dustproof ring provided at an end of the sealing end cap distal to the outer tube and between the extension rod and the sealing end cap,
   wherein the sealing assembly is provided between the dustproof ring and the sliding bearing.

3. The linear drive apparatus of claim 1, wherein the drive mechanism is a DC motor with a planet reduction gear and Hall signal feedback, and
   a power output terminal of the DC motor is connected to the first end of the screw through a coupling.

4. The linear drive apparatus of claim 2, wherein the drive mechanism is a DC motor with a planet reduction gear and Hall signal feedback, and
   a power output terminal of the DC motor is connected to the first end of the screw through a coupling.

5. The linear drive apparatus of claim 3, wherein:
   the first end of the screw is positioned in the front section of the outer tube and is in a drive connection with the DC motor through the coupling,
   the extension rod is positioned in the back section of the outer tube,
   a first O-shaped sealing ring is provided between the sealing end cap and the first tube end of the outer tube, and
   a sealing ring is provided between the screw and an interface of the coupling.

6. The linear drive apparatus of claim 4, wherein:
   the first end of the screw is positioned in the front section of the outer tube and is in a drive connection with the DC motor through the coupling,
   the extension rod is positioned in the back section of the outer tube,
   a first O-shaped sealing ring is provided between the sealing end cap and the first tube end of the outer tube, and
   a sealing ring is provided between the screw and an interface of the coupling.

7. The linear drive apparatus of claim 1, wherein:
   the extension rod is positioned in the back section of the outer tube,
   a first O-shaped sealing ring is provided between the sealing end cap and the first tube end of the outer tube, and
   a sealing ring is provided between the screw and an interface of the coupling.

8. The linear drive apparatus of claim 2, wherein:
   the extension rod is positioned in the back section of the outer tube,
   a first O-shaped sealing ring is provided between the sealing end cap and the first tube end of the outer tube, and
   a sealing ring is provided between the screw and an interface of the coupling.

9. The linear drive apparatus of claim 1, wherein the sealing assembly includes a group of O-shaped sealing rings.

10. The linear drive apparatus of claim 2, wherein the sealing assembly includes a group of O-shaped sealing rings.

11. The linear drive apparatus of claim 3, wherein the sealing assembly includes a group of O-shaped sealing rings.

12. The linear drive apparatus of claim 4, wherein the sealing assembly includes a group of O-shaped sealing rings.

13. The linear drive apparatus of claim 5, wherein the sealing assembly includes a group of O-shaped sealing rings.

14. The linear drive apparatus of claim 6, wherein the sealing assembly includes a group of O-shaped sealing rings.

15. The linear drive apparatus of claim 7, wherein the sealing assembly includes a group of O-shaped sealing rings.

16. The linear drive apparatus of claim 8, wherein the sealing assembly includes a group of O-shaped sealing rings.

\* \* \* \* \*